Sept. 17, 1940.  J. A. JOHNSON  2,215,003
AUTOPLANE
Filed June 7, 1938     7 Sheets-Sheet 1
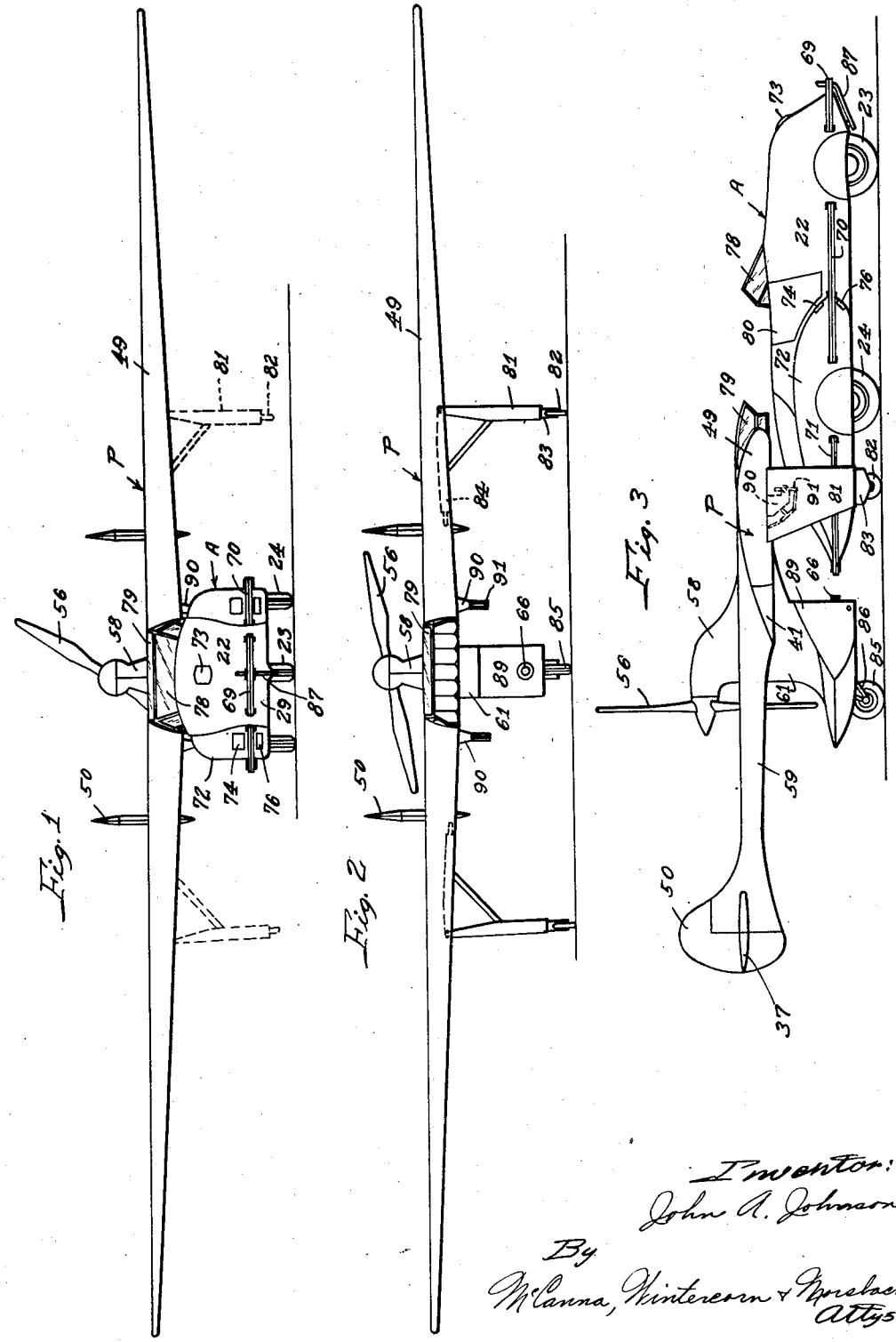
Inventor:
John A. Johnson
By
McCanna, Wintercorn & Morsbach
Attys.

Sept. 17, 1940.   J. A. JOHNSON   2,215,003
AUTOPLANE
Filed June 7, 1938   7 Sheets-Sheet 2
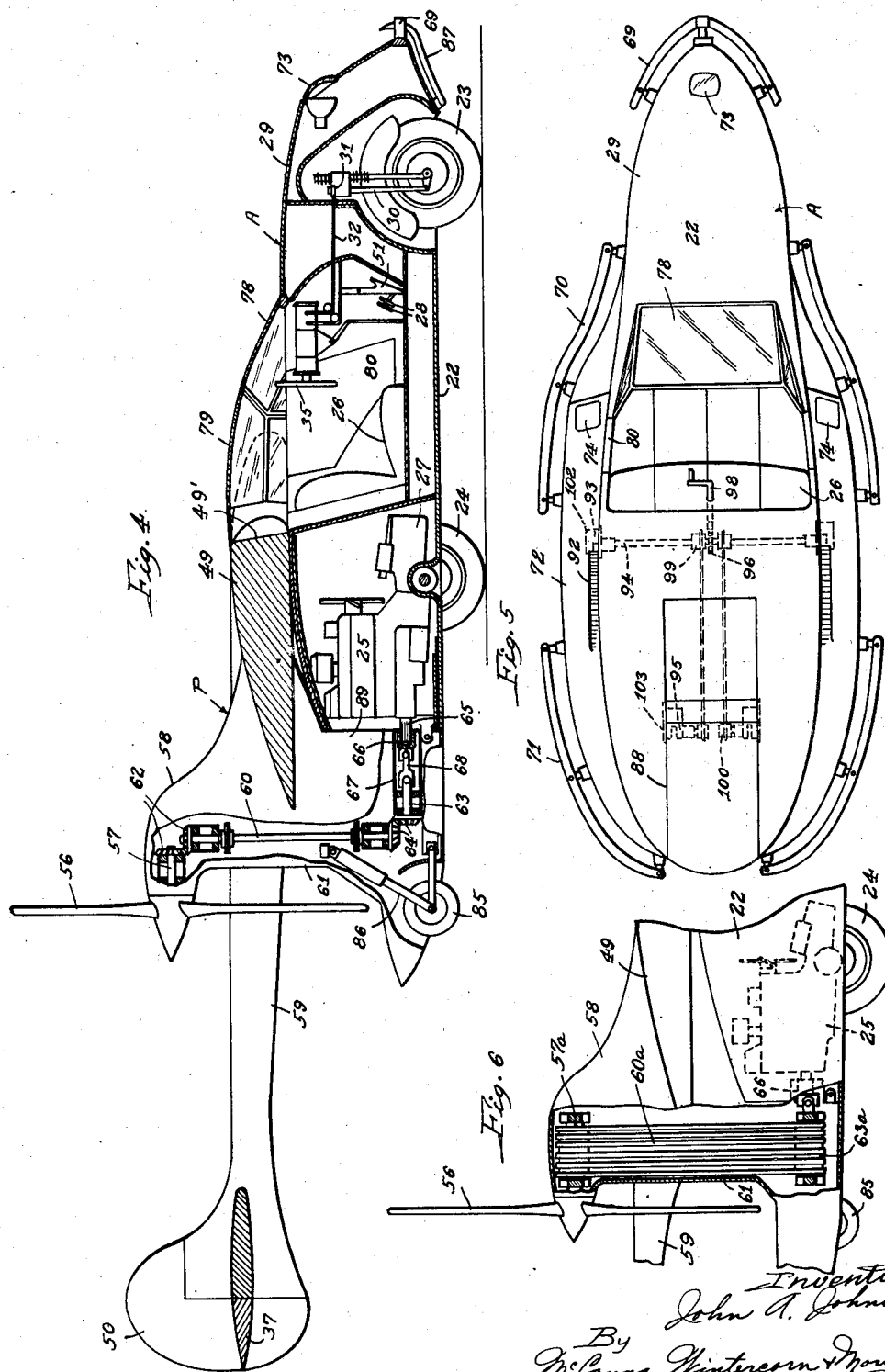

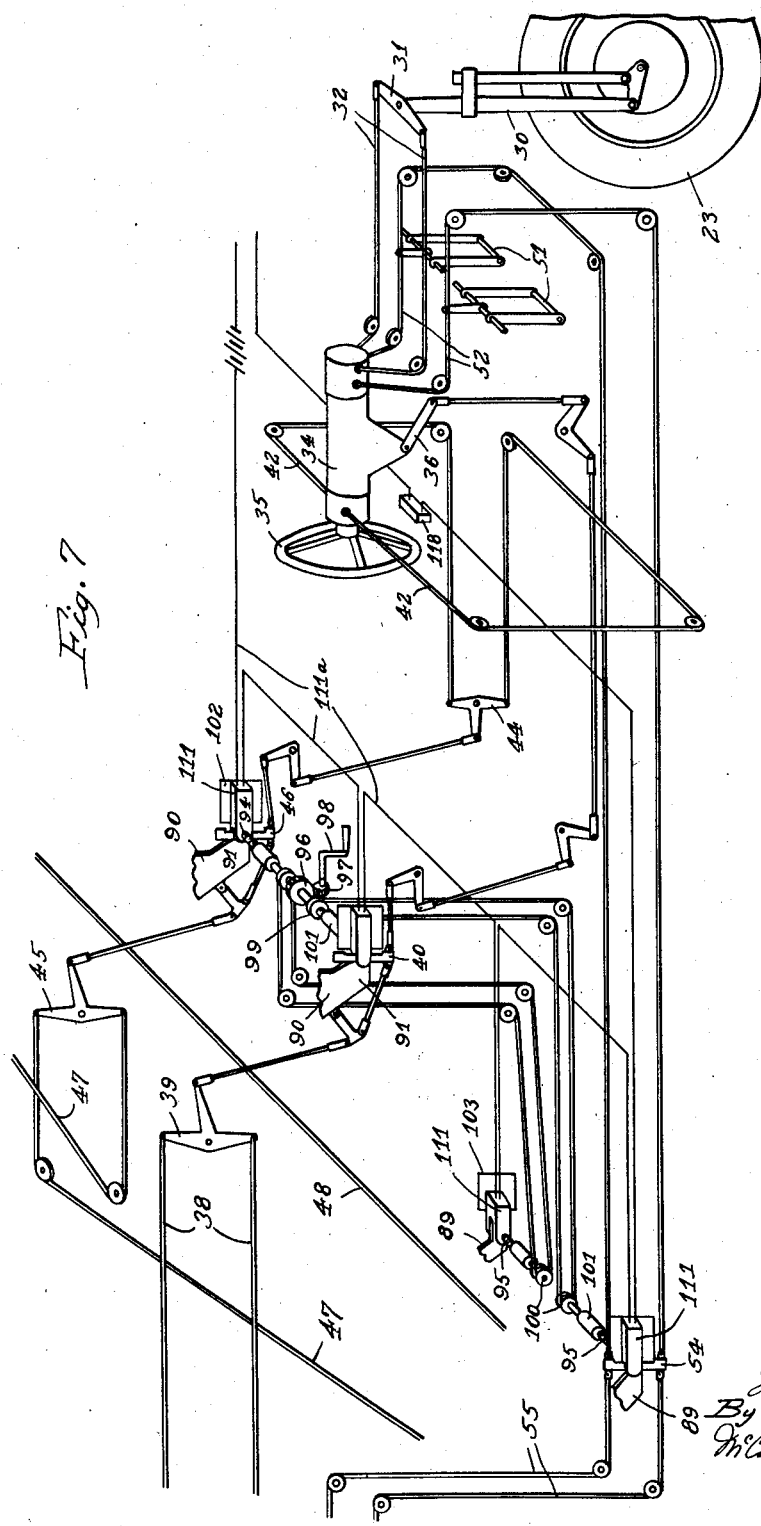

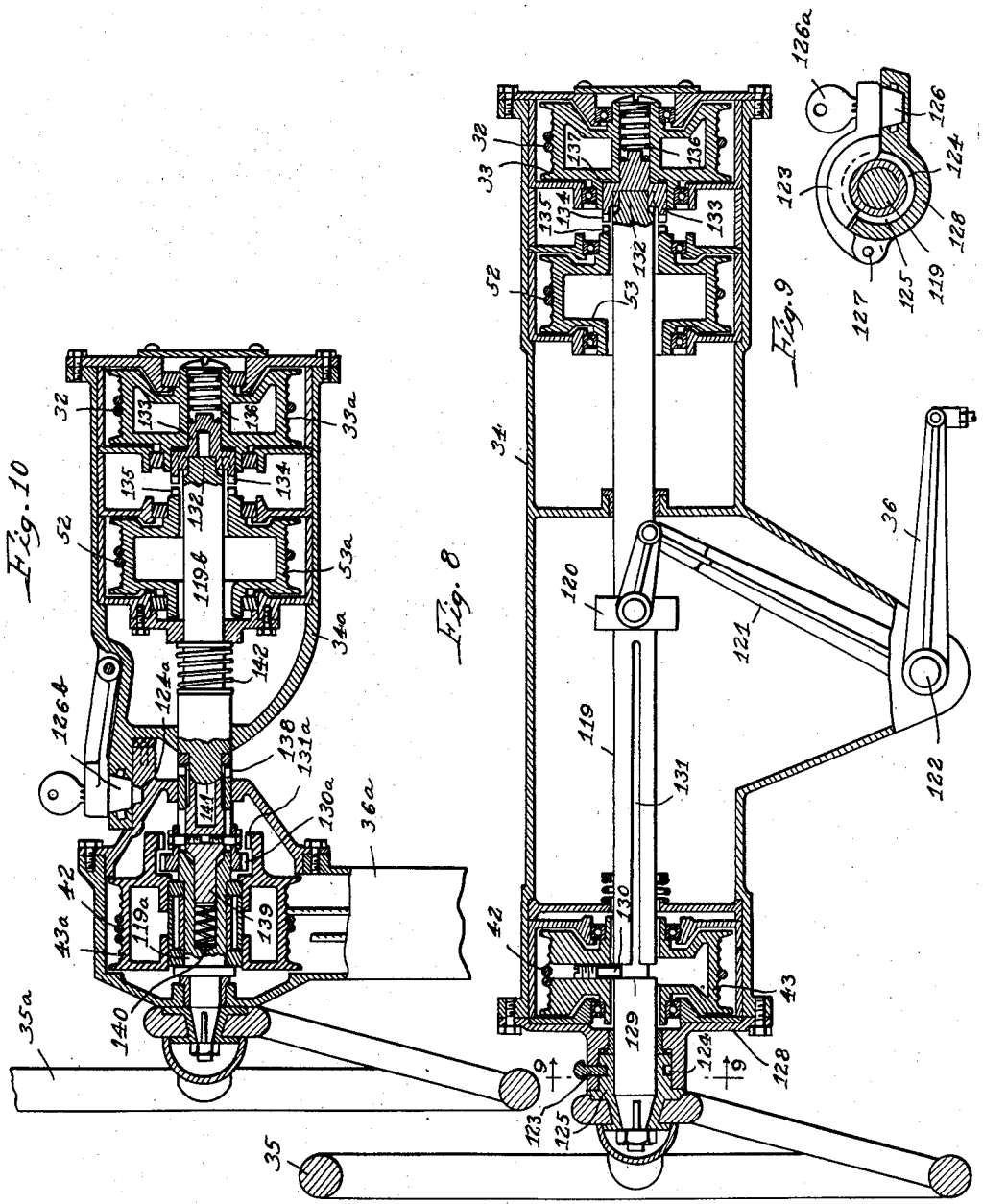

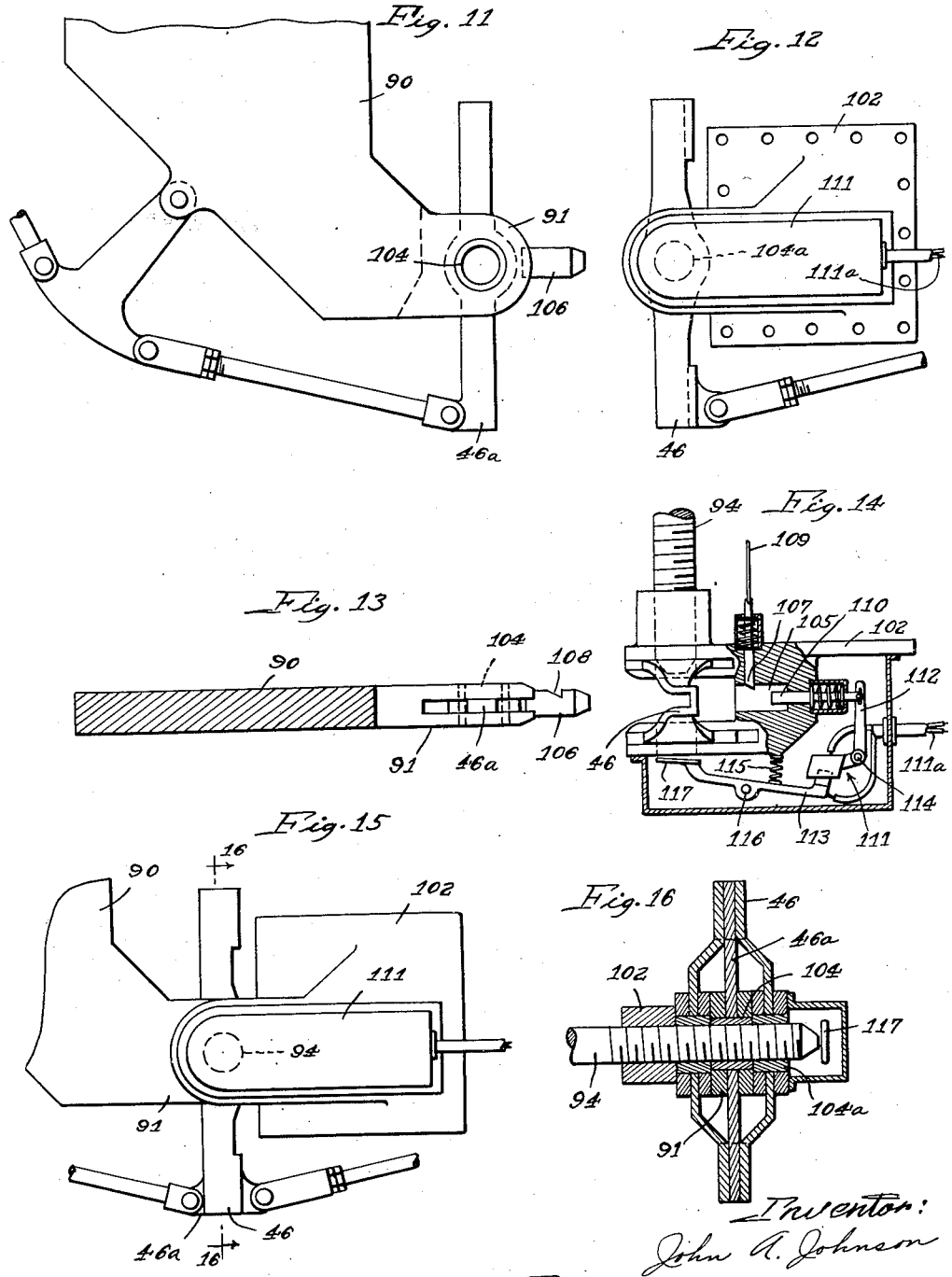

Sept. 17, 1940. J. A. JOHNSON 2,215,003
AUTOPLANE
Filed June 7, 1938 7 Sheets-Sheet 6
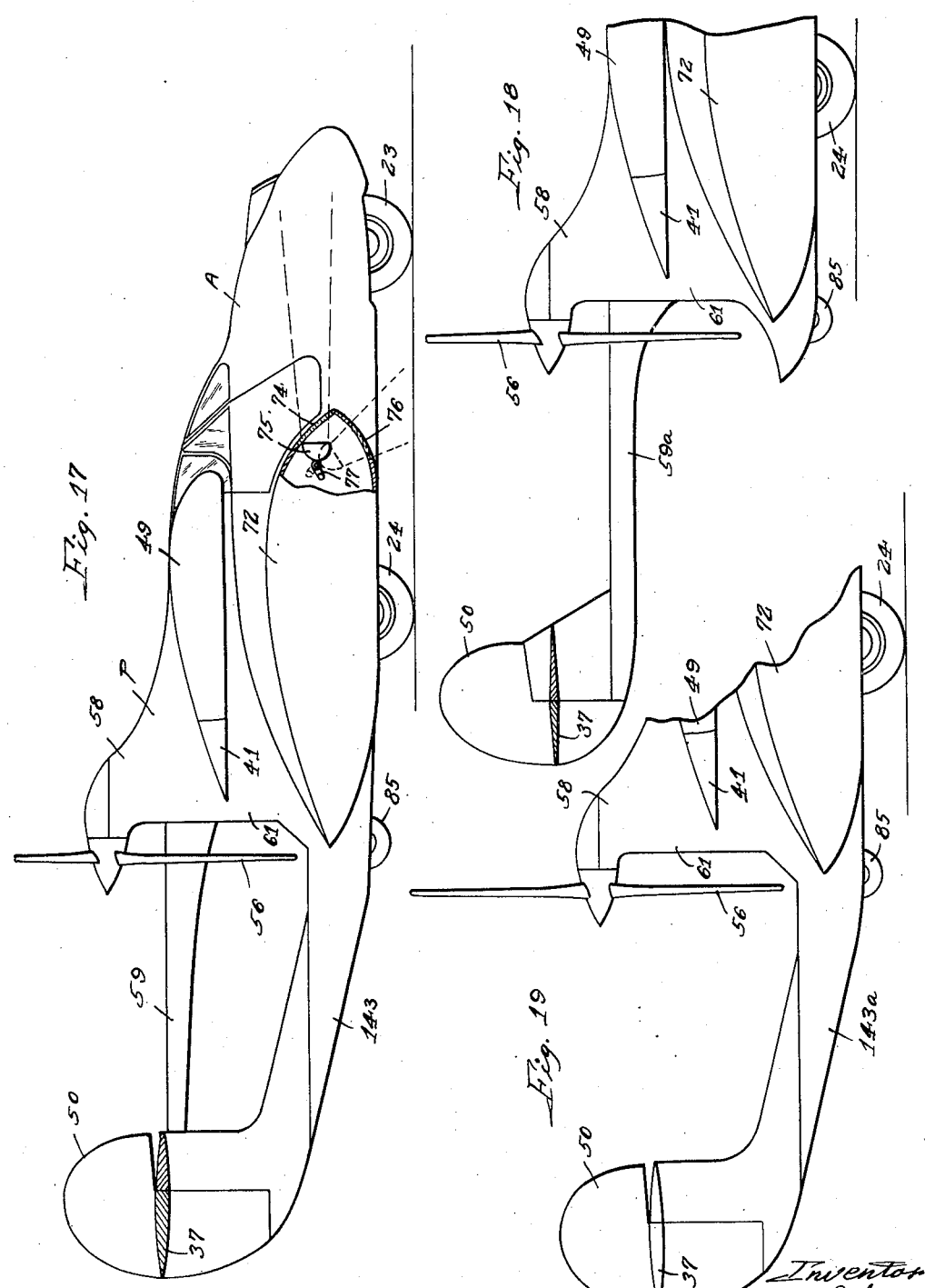

Sept. 17, 1940.   J. A. JOHNSON   2,215,003
AUTOPLANE
Filed June 7, 1938   7 Sheets-Sheet 7
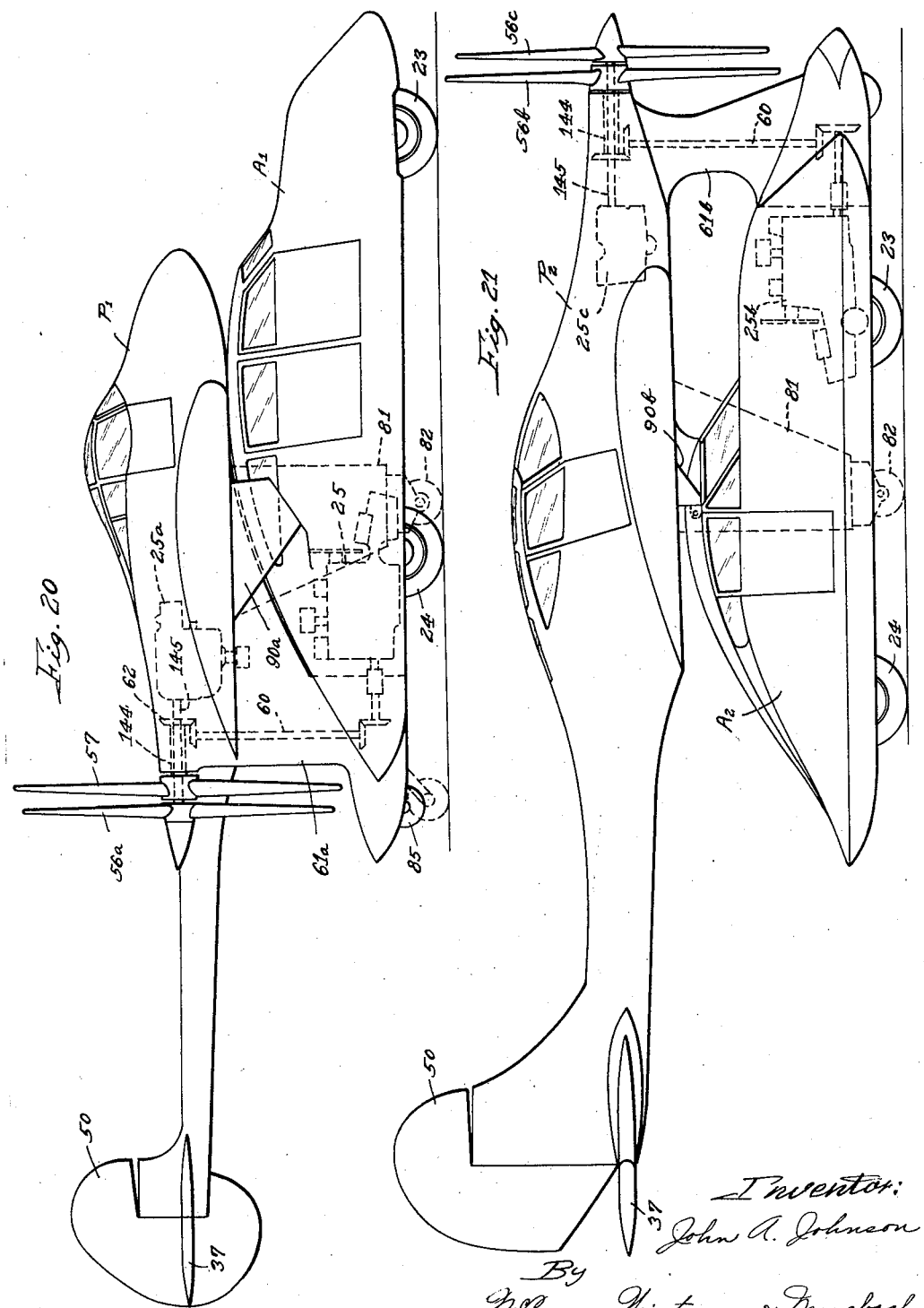

Patented Sept. 17, 1940

2,215,003

UNITED STATES PATENT OFFICE 2,215,003

AUTOPLANE

John A. Johnson, Eureka, Ill.

Application June 7, 1938, Serial No. 212,323

36 Claims. (Cl. 244—2)

This invention relates to a combination airplane and automobile adapted for traveling on land or in the air.

The principal object of my invention is to provide a specially constructed automobile, or auto unit, as it will hereinafter be termed, and a specially constructed airplane, or plane unit, said units designed for quick and easy detachable connection to permit use of the auto unit separately, as any conventional automobile, or interchangeably in conjunction with the plane unit as any conventional airplane.

Another important object of my invention is to provide a combination vehicle of the kind mentioned in which the plane unit is self-supporting and easily portable on its own wheels to and from the auto unit, so that one man, or two at the most, can take care of the connection and disconnection of the units.

Still another object is to provide a combination vehicle of the kind mentioned including novel mechanism for securely locking the auto and plane units together and at the same time establishing good connections between controls on the two units to enable manipulation of the ailerons, rudders, and elevators on the plane unit from the auto unit. A special feature in this combination of connections is the provision of a single manually operable means for driving the locking pins home simultaneously or withdrawing the same simultaneously, and the provision of safety switches on all of the connections operable by the locking pins and connected in series with the ignition switch so as to insure secure locking of the units together and good connections between the controls on the two units before the autoplane takes off.

Another important object is the provision of a convertible steering wheel type control means in which when the mechanism is locked in one position the steering wheel steers the front wheel or wheels of the auto unit and which when locked in another position, for flying, has the steering wheel arranged to operate the elevators by fore and aft movement and the ailerons by rotary movement, the front wheel or wheels being meanwhile disconnected from the steering wheel but interconnected with the rudder controls, so that the front wheel or wheels of the auto unit are steered simultaneously with the operation of the rudders, which, of course, is highly advantageous both in taking off and landing, as well as in taxiing about on the field.

Still another important object is to provide a combination vehicle generally similar to what has been described, but in which the plane unit is an independent unit having a separate cockpit and an auxiliary engine driving a propeller, this plane unit having all the necessary equipment to fly without the auto unit, but constructed nevertheless for connection therewith. A special feature of these combination units is the provision of a second propeller on the plane unit coaxially disposed with respect to the first propeller and arranged to be driven through detachable connection with the engine of the auto unit and to cause the starting of the auxiliary engine by its slip stream reaction on the first mentioned propeller.

These and various other objects and advantages of my invention will appear in the course of the following description in which reference is made to the accompanying drawings, wherein—

Figure 1 is a front view of the autoplane of my invention;

Fig. 2 is a front view of the plane unit removed from the auto unit;

Fig. 3 is a side view of the two units in spaced relation preparatory to their being connected together;

Fig. 4 is a longitudinal section through the autoplane ready for flight;

Fig. 5 is a plan view of the auto unit;

Fig. 6 is a fragmentary view partly in side elevation and partly in longitudinal section corresponding to a portion of Fig. 4, showing a belt drive for the propeller;

Fig. 7 is a schematic drawing illustrating the interconnected controls on the two units and the electrical circuit connections for the safety switches provided at the points of interconnection;

Fig. 8 is a longitudinal section through the steering wheel control mechanism;

Fig. 9 is a sectional detail on the line 9—9 of Fig. 8;

Fig. 10 is a view similar to Fig. 8, showing an alternative construction;

Figs. 11 and 12 are side views of a typical pair of related control parts on the plane and auto units adapted to be interconnected by a union in the manner shown in Fig. 15;

Figs. 13 and 14 are horizontal sections to better illustrate the parts shown in Figs. 11 and 12, respectively;

Fig. 16 is a cross-section through the union, taken on the line 16—16 of Fig. 15;

Fig. 17 is a side view of an autoplane similar to that shown in Fig. 4, but having a different tail construction and illustrating also the two-purpose lights in the fenders for the back wheels;

Figs. 18 and 19 are fragmentary side elevational views similar to the rear portion of Fig. 17, but showing two other tail constructions;

Fig. 20 is a side view of a different design of autoplane having an auxiliary engine in the plane unit driving a propeller in tandem with the propeller driven by the auto unit engine, and Fig. 21 is a side view of still another autoplane similar to Fig. 20, but having tractor propellers.

Similar reference numerals are applied to corresponding parts throughout the views.

Referring first to Figs. 1 to 5 and 7, the letter A designates the auto unit and the letter P the plane unit, which, when joined together, form the autoplane shown in Figs. 1 and 4. The auto unit A has a light streamlined body 22 mounted on a single front steering wheel 23 and two rear drive wheels 24. The engine 25 is mounted in the body behind the seat 26 and is adapted to drive the wheels 24 through a suitable clutch and differential and change-speed gears, the latter being contained in the housing 27. The gear shift lever isn't shown, but there is shown at 28 the usual clutch and brake pedals, and it will be understood that all of the usual controls found in the conventional automobile, or their equivalents, will be provided in the auto unit A in connection with the engine 25 and transmission 27 so as to permit driving the auto unit substantially in the same way as any other automobile. The front end 29 of the body 22 is narrower than the rest of the body and forms an enclosure for the front steering wheel 23 which is mounted in a spring cushioned steering fork 30 generally similar to the front fork of a motorcycle. This fork is pivotally mounted on the body 22 and equipped with a cross-bar 31 having cables 32 connected to opposite ends thereof and extended rearwardly in the body over suitable guide pulleys and wound on a drum 33 (Fig. 8) which is rotatably mounted in the housing 34 and adapted to be operated by the steering wheel 35. This steering wheel may be locked in land travel or air travel positions, as will soon appear. When operating in air travel position, fore and aft movement of the steering wheel is the equivalent of fore and aft movement of a joy-stick and causes oscillatory movement of the lever 36 to raise and lower the elevators 37 on the plane unit P by means of cables 38 connected to the T 39. The latter is operated by a system of push and pull rods, some on the auto unit and the rest on the plane unit interconnected by the union 40 when the two units are fastened together. Rotary motion of the steering wheel when in air travel position corresponds to lateral movement of a joy-stick and operates the ailerons 41 by means of cables 42 wound on the drum 43 (Fig. 8) in the housing 34. These cables connect to a T 44, the oscillatory movement of which causes similar oscillatory movement of a T 45 in the plane unit P connected with T 44 by a system of push and pull rods, part of which are on the auto unit and the rest on the plane unit but adapted to be interconnected by the union 46 when the two units are fastened together. The T 45 has cables 47 extending therefrom to the ailerons 41 to raise one and lower the other simultaneously. The cable indicated at 48 is the cross-connecting cable between the ailerons at opposite ends of the wing 49. The rudders 50 on the plane unit P are operable by stirrups 51 which take the place of a rudder bar, being interconnected by cables 52 wound on a drum 53 (Fig. 8) in the housing 34, so that when one stirrup is pushed forward the other moves rearwardly, and vice versa. The same cables 52 extend over guide pulleys to the opposite ends of a union 54 which interconnects these cables on the auto unit with other cables 55 on the plane unit connected with the rudders 50 in the usual way. It will soon appear that when the steering wheel 35 is in air travel position, the drums 33 and 53 are automatically clutched to turn together independently of the steering wheel, so that when the rudders 50 are moved for a right or left-hand turn, the wheel 23 will be turned accordingly, thus facilitating matters in taking off and landing and also when taxiing about on the flying field. The pusher type propeller 56 carried on the stub shaft 57 in a fairing 58 projecting upwardly and rearwardly from the middle of the wing 49 between the laterally spaced tail booms 59 is arranged to be driven by the engine 25 with which it makes detachable connection when the plane unit P is fastened to the auto unit A. A vertical shaft 60 suitably supported in bearings in the vertical fin 61 forming a continuation of the fairing 58 and projecting down below the trailing edge of the wing 49, is connected at its upper end with the stub shaft 57 by bevel gears 62 and at its lower end with another stub shaft 63 by bevel gears 64. A splined extension 65 of the crank-shaft of the engine 25 fits in an internally splined coupling member 66 rotatably mounted in the sleeve 67 carried in the lower end of the fin 61, and an intermediate drive shaft 68 has universal joint connections at opposite ends with the stub shaft 63 and coupling member 66 to provide a good driving connection between the engine 25 and propeller 56 regardless of any slight misalignment between the crank shaft extension 65 of the engine and the stub shaft 63.

If desired, a multiple belt drive may be provided in connection with the propeller 56, as shown at 60a in Fig. 6, in which the belts operate on pulleys 57a and 63a which take the place of the stub shafts 57 and 63, respectively, the pulley 57a being, of course, directly connected with the propeller 56 and the pulley 63a being connected with the coupling member 66, as shown.

In operation, it is evident that when the auto unit A is operated by itself, detached from the plane unit P, it can be driven practically the same as any conventional automobile, that is to say, there are no objectionable airplane controls to interfere with the operation of the auto unit as an automobile, especially in view of the fact that the steering wheel 35 when locked in land travel position is divorced from the airplane controls otherwise operable by the steering wheel when locked in air travel position. When driving about through traffic and when parked, the spring cushioned bumpers 69, 70, and 71 at the front, middle and rear of the auto unit avoid damage to the body 22 and fenders 72 over the rear wheels 24. A single head light is provided at 73 in the front end or nose of the body 22, and two other lights are provided at 74 in the front end of the fenders 72, the lights used at these points being preferably of the tiltable type shown at 75 in Fig. 17 to throw the light forwardly substantially horizontally as any ordinary head light, or forwardly and downwardly to illuminate the ground when taking off and landing with the auto unit forming part of the autoplane. It will be noticed that the fenders 72 have separate lower lenses 76, as in Figs. 3 and 17, for the latter purpose, and any suitable or preferred means may be connected to the arms 77 on the lights 75 to shift them from one position to the other. The windshield 78 on the auto unit cooperates with a window extension 79 on the leading edge of the wing 49 at the middle thereof to completely enclose the seat 26 and form a cock-pit when the units A and P are fastened together, as best appears in Fig. 4. Side doors 80 on the auto unit enable the driver or pilot to get into and out of the auto unit, and when the auto unit is an assembled part of the autoplane, the same mode of ingress and egress may be used, assuming that part of the top window extension 79 on the plane unit P is made foldable or slidable from open to closed position. Otherwise the large middle panel of the extension 79 may be mounted to swing upwardly or slide rearwardly in a manner quite common in airplane design to permit the pilot to get in or out when the auto unit is an assembled part of the autoplane.

In the operation of the autoplane, the steering wheel 35 is locked in air travel position and operates the ailerons 41 and elevators 37 by rotary motion and back and forth motion, respectively. The fact that the front wheel 23 under these conditions is no longer connected with the steering wheel 35 but is operated with the rudders 50, enables one to maneuver the autoplane quite handily and the pilot will experience no difficulty in taking off and landing on small fields. In taking off, the transmission 27 may or may not be thrown into neutral; in most instances it is believed the pilot will find it of advantage, especially on small fields, to use the drive wheels 24 at least long enough to get the autoplane close to take-off speed, after which the actual take-off can, of course, be accomplished with the propeller 56. In that way, a comparatively short runway will suffice. In landing, the pilot is assured of having the front wheel 23 in a straightforward position due to its connection with the controls for the rudders 50 by means of drums 33 and 53. The autoplane can land on its three wheels 23—24 alone, or, if desired, the pilot may swing down the retractible wheel-carrying legs 81, the wheels 82 in which are vertically adjustable on plungers 83. Any tendency to pitch sideways would be counteracted by engagement of the wheels 82 with the ground. Recesses 84 in the wing 49 accommodate these retractible wheels and legs. A rear wheel 85 is retractible to the position shown in Fig. 4 up into the fin 61 on the carriage 86 and projects sufficiently in its retracted position to protect the autoplane against damage in landing in case the tail drops. A skid 87 projecting rearwardly from the middle of the front bumper 69 under the nose of the autoplane will serve to protect the nose in landing and facilitate passage through tall grass and wherever a blunt nosed body might make the going difficult. In passing, it is believed to be clear from this description that the autoplane is well balanced and will go into a glide when hands and feet are removed from the controls during flight, the weight of the body 22 forwardly from the seat 26 and the weight of the pilot and passenger being sufficient to offset the weight of the engine 25 and its drive connections with the propeller so that the center of gravity is properly located with respect to the leading and trailing edges of the wing 49, in keeping with accepted good aerodynamic design.

Referring to Figs. 2 and 3, it will be observed that the plane unit P when detached from the auto unit is self-supporting and can be moved about easily on its own wheels 82—85 forming a three-point support for the unit. The plane unit P can be moved into position for assembly on the auto unit A from the rear, as shown in Fig. 3, and one man, or two men at the most, should be able to take care of the assembling together of the units in a few minutes, without difficulty. The adjustability of the wheel carriers 83 and 86 will greatly facilitate the assembling of the units, and any suitable or preferred means may be employed for retracting these wheels either prior to or immediately after the autoplane has taken off. Retractible landing gears are so well known that I have not deemed it necessary or expedient to go into details to illustrate the structure of the means 81 and 86 beyond the extent shown in Figs. 1 to 3. The rear end of the auto unit body 22 is bifurcated, as indicated at 88 in Fig. 5, to accommodate the dovetail lower portion 89 of the fin 61 on the wing 49 in the manner shown in Fig. 4, while at the same time two depending arms 90 on the wing have their dovetail lower ends 91 ride along grooves 92 in the tops of the fenders 72 into sockets 93. When the wing 49 is in place, its cutaway middle portion 49' registers with the back of the driver's seat 26. Four locking pins serve to fasten the units A and P securely together at four points, two of these pins, numbered 94, cooperating with the dovetail ends 91 on the arms 90 and the other two, numbered 95, cooperating with the lower front corner portions of the dovetail 89. The locking pins 94 and 95 are all screw threaded and interconnected for simultaneous operation to and from locking position. Any suitable or preferred means for accomplishing this may be provided, although I have shown a single worm wheel 96 operable by means of a worm 97 arranged to be turned by a detachable hand crank 98 insertible through a hole in the back of the seat 26. The worm wheel 96 turns two pulleys 99 through suitable splined connections therewith. These pulleys are carried on the two locking pins 94 and are connected by cables to two other pulleys 100 carried on the locking pins 95. All of the locking pins are threaded in stationary bearings, indicated at 101, and when rotated in one direction move toward locking position and when turned in the opposite direction are retracted again. Guide blocks 102 and 103 provided on the auto unit have the pins 94 and 95 operable transversely therein to couple the auto unit to the plane unit by means of the dovetail portions 89 and 91 provided on the latter. At the same time that the units A and P are thus coupled, the aileron, elevator and rudder controls on the two units are also connected, the elevator controls being joined by the union 40 by means of one of the locking pins 94 and the aileron controls being joined by the union 46 with the other locking pin 94, while the rudder controls are joined by the union 54 with one of the locking pins 95. Inasmuch as all of these unions are substantially the same, the illustration of the union 46 for the aileron controls illustrated in Figs. 11 to 16 will suffice to convey a good understanding of the construction of all three unions.

The union member 46 is channel-shaped and accommodates the mating union member 46a therein, as indicated in Figs. 15 and 16. The hole 104 in the dovetail 91 is provided by a bushing in the union member 46a, and when this bushing registers with bushings 104a supporting the union member 46 the locking pin 94 can be entered through these bushings in the manner shown in Fig. 16, whereby not only to interconnect the units A and P by means of a locking pin 94 at this point, but also provide a pivotal mounting on the locking pin for the union 46—46a, so that push and pull movement transmitted from the T 44 to the union 46 is transmitted through the union 46 to the T 56 to operate the ailerons 41. In like manner, the other locking pin 94 not only provides a point of connection between the units A and P, but provides a pivot for the union 40 for the transmission of control movements from the auto unit to the plane unit to operate the elevators. Likewise, one of the locking pins 95 associated with the union 54 on the rudder controls serves both as a pivot for the union and as a means of fastening the auto and plane units together. In passing, it will be noticed in Fig. 14 that a socket 105 is provided in the member 102 to receive a pilot projection 106 on the dovetail 91, which, in entering the socket, forces out a spring pressed latch 107 arranged to enter a notch 108 in the side of the pilot when the latter has moved all the way in. This latch 107 serves to releasably secure the parts together preliminary to the operation of the locking pins 94—95 to operative position, and the latch may be withdrawn by means of a cord or wire connection 109 when the locking pins 94 are retracted and it is desired to disconnect the plane unit from the auto unit. There will be four of these latches 107, one for each of the locking pins, and, of course, four flexible connections 109 for manually releasing the same simultaneously from one point. The pilots 106 not only assure good registration between the parts to be coupled on the two units A and P, but they also serve to operate spring pressed plungers 110 associated with safety switches 111 that are connected in series in the ignition circuit for the engine 25, as indicated by the conductors 111a in Fig. 7, so that there is definite assurance that the units A and P are firmly connected at the four points by the four locking pins 94—95 before the plane takes off. Outward movement of the plunger 110 causes the switch member 112 to be disconnected from its companion member 113 by movement about the pivot 114. The member 113 is held in the position shown in Fig. 14 by means of a spring 115, and is movable on its pivot 116 by the engagement of the locking pin 94 with the pad 117 to remake the electrical connection between members 112 and 113 previously broken by operation of the plunger 110. However, it is obvious that unless the locking pins are moved all the way home, they will not move the switch members 113 sufficiently to make good electrical connection with their companion members 112, and hence the operator knows upon checking his ignition when he closes the ignition switch 118 that if the engine will run, all of the locking pins 94—95 have been moved home and the plane unit P is firmly connected to the auto unit A.

Referring now to Figs. 7 and 8, and more particularly Fig. 8, for an understanding of how the steering wheel 35 may be locked detachably in either of two positions for land and air travel, it will be seen that the wheel 35 is mounted on a shaft 119 reciprocable and rotatable in bearings in the housing 34. A collar 120 in which the shaft 119 is rotatable moves endwise with the shaft to oscillate a lever 121 secured to the cross-shaft 122 to which the lever 36 previously mentioned as connected with the elevators 37 is attached. In that way endwise movement of the shaft 119 in the fore and aft movement of the steering wheel 35 serves to operate the elevators similarly as fore and aft movement of a joystick. The shaft 119 is shown locked with the steering wheel 35 in land travel position by the hasp 123 entered in the annular groove 124 in the hub 125 on the steering wheel. The key lock 126 serves to hold the hasp 123 in the position shown, the hasp being pivoted at 127 on the end plate 128 of the housing 34 for swinging movement toward and away from the hub 125, as shown in Fig. 9. When the steering wheel and shaft are in this position, an annular groove 129 in the shaft has a pin 130 in the drum 43 projecting therein so that the shaft can turn without turning the drum. This pin 130 is adapted, however, to serve as a spline slidable in the longitudinal groove 131 in the shaft when the lock hasp 123 is engaged behind the hub 125 locking the steering wheel 35 and shaft 119 in air travel position, and under those conditions it is obvious that the shaft 119 may be moved endwise by fore and aft movement of the steering wheel to operate the elevators, but when the steering wheel 35 is turned to the right or left to operate the ailerons, the drum 43 will turn with the shaft by reason of the engagement of pin 130 in the groove 131. So long as the shaft 119 is locked in land travel position, its square inner end 132 holds a coupling sleeve 133 so that its teeth 134 are disengaged from teeth 135 on the hub of the drum 53, and the drum 33 can therefore be turned independently of the drum 53 to steer the front wheel 23 by means of cables 32. However, when the shaft 119 is locked in air travel position by entry of the lock hasp 123 behind the hub 125, the square end 132 of the shaft is withdrawn from the coupling sleeve 33 and the latter is moved under pressure of the coiled compression spring 136 to couple the drums 33 and 53 together by interengagement of the teeth 134 and 135. The sleeve 133, it will be understood, is of square or other polygonal form and slidable freely but non-rotatably in the hub 137 on the drum 33. In that way, when the steering wheel and its shaft are in air travel position, the pilot may move the steering wheel back and forth to operate the elevators and turn it to operate the ailerons, all independently of the drums 33 and 53, but the drums 33 and 53 are interconnected so that whenever the rudders are operated by means of the pedals 51, the front wheel 23 of the auto unit will be operated to the right or left accordingly as a right or left-hand turn is desired, due to the fact that the drum 33 connected with the wheel 23 is coupled to the drum 53 associated with the rudders 50. The lock 126 can be operated by the key 126a to lock the steering wheel in land or air travel position.

The modified or alternative construction shown in Fig. 10, has a housing 34a containing only the drums 33a and 53a associated with the steering wheel 23 and rudders 50, respectively. The drum 43a associated with the ailerons 41 is carried in the upper end of a hollow control stick 36a pivoted at its lower end for swinging movement in a fore and aft direction with the steering wheel 35a, whereby to operate the elevators 37 by direct oscillation of a lever similar to the lever 36 but which with this construction will oscillate with the control stick 36a. The control shaft in this case is made in two sections 119a and 119b, arranged to be coupled together, as at 138, when the steering wheel 35a is locked in land travel position, as shown in Fig. 10, by the lock 126b engaging in the recess 124a. A gear 130a is carried on a slidable member 139 urged normally in one direction by a coiled compression spring 140 to engage the gear 130a in the internal gear teeth 131a on the hub of the drum 43a, whereby to interlock the drum 43a with the shaft section 119a to turn with the steering wheel 35a. However, when the steering wheel is locked in land travel position, the member 139 is moved forwardly against the action of the spring 140 by the protruding reduced end 141 of the shaft section 119b to disengage the gear 130a from the teeth 131a, as shown in Fig. 10, so that turning of the steering wheel 35a does not affect the drum 43a. However, under these conditions, when the steering wheel is turned, the drum 33a connected with the front wheel 23 by the cables 32 is turned to steer the wheel 23. A coiled compression spring 142 tends normally to move the shaft section 119b forwardly, and when the steering wheel 35a is unlocked from land travel position the shaft section 119b moves under the action of the spring 142 to disengage the square end 132 from the coupling collar 133 and allows the latter to establish connection between the drums 33a and 53a similarly as in the construction of Fig. 8. The operation of this control mechanism is therefore closely similar to the operation of that previously described.

In Fig. 17, I have shown an autoplane closely similar to that of Figs. 1 to 5, except that in this case the plane unit P has a sturdier tail group, there being a central lower boom 143 in addition to the laterally spaced upper booms 59. The operation of this autoplane will, of course, be substantially the same as the one previously described.

Fig. 18 shows a portion of still another autoplane in which the laterally spaced tail booms 59a support the tail group at a higher elevation with a view to obtaining better response in the operation of the elevators and rudders. In Fig. 19, still another autoplane construction is shown in which the spaced booms 59 are eliminated and the tail group is carried on a single lower boom 143a. The operation of these autoplanes will, of course, be substantially the same as the operation of the one previously described.

In Figs. 20 and 21, I have shown two different designs of autoplanes, in which the auto units and plane units, although coupled together in substantially the same way as in the other autoplanes, have separate passenger compartments and are equipped with auxiliary engines and extra propellers to handle the extra load due to increased weight of the assembled units and the extra passengers which can be carried. Thus, in Fig. 20, the auto unit A₁ is generally similar to the auto unit A of Figs. 1 and 3 to 5, but is of a sedan type capable of seating four or five passengers. The plane unit P₁ has a separate cockpit seating two passengers. In order to carry this added load, the vertical fin 61a is much heavier than the corresponding fin on the other plane units, and the same is true of the arms 90a carrying the dovetail parts for coupling the units together in a manner similar to what has been described. The propeller 56 in this case has a sleeve 144 carrying the bevel gear 62 by means of which the propeller is driven through the shaft 60 from the engine 25 in the auto unit A₁ similarly as in the autoplane of Figs. 1 to 5. However, in this case a separate auxiliary engine 25a has the crankshaft 145 thereof extending through the sleeve 144 to drive a second propeller 56a in concentric tandem relation with the propeller 56. In that way, when the engine 25 is started preliminary to the take-off of the autoplane, the slip stream from propeller 56 reacting upon propeller 56a will result in the starting of the auxiliary engine 25a, and the two propellers working together in opposite directions are sufficient to fly the autoplane at as high, if not higher, speed than the autoplane first described.

The autoplane as shown in Fig. 21 is substantially the reverse of that illustrated in Fig. 20, the two propellers 56b and 56c being of the tractor type carried on the nose of the plane unit P₂ and the main engine 25b and auxiliary engine 25c being carried in the front ends of the units A₂ and P₂. A fin 61b in this case couples to the front end of the auto unit, and the arms 90b also couple to the auto unit from the front. However, the operation of this autoplane will be substantially the same as the one shown in Fig. 20—the starting of the engine 25b will result in the starting of the auxiliary engine 25c by reason of the reaction of the propeller 56b upon propeller 56c.

It should be understood that while I have disclosed independent plane units in Figs. 20 and 21 with auxiliary engines, I may also equip dependent plane units like that shown in Figs. 1–4 and 17, 18 and 19 with auxiliary engines.

It is believed the foregoing description conveys a good understanding of the objects and advantages of my invention. The appended claims have been drawn with a view to covering all legitimate modifications and adaptations.

I claim:

1. A combination land and air vehicle of the character described comprising an auto unit and a plane unit adapted to be interconnected to form an autoplane, the auto unit comprising an engine, driving and steering ground-engaging wheels, a manually operable steering wheel operatively connected with the latter, and means providing a driving connection between the driving wheels and the engine, the plane unit comprising supporting and control surfaces for sustained flight in the air, a propeller on the plane unit, and means for detachably transmitting drive from the engine to said propeller, manual control means on the auto unit adapted to be detachably connected with control means on the plane unit connected with its control surfaces, couplings for detachably connecting said control means on the auto and plane units, correlated couplings for detachably connecting the plane unit with the auto unit and disposed in juxtaposition with the last named couplings, and a single means joining inner engaged couplings on the two units whereby the units are connected and their control means simultaneously interconnected.

2. A combination land and air vehicle of the character described comprising an auto unit and a plane unit adapted to be interconnected to form an autoplane, the auto unit comprising a body with a driver's seat therein, forwardly and rearwardly located ground-engaging steering and driving wheels on said body, a manually operable steering wheel in said body normally operatively connected with the front steering wheel but adapted to be disconnected therefrom, and a rearwardly mounted engine in said body having a direct detachable driving connection with the rear wheels, the engine having an outwardly projecting drive shaft for detachable coupling connection with the plane unit, the plane unit comprising supporting and control surfaces for sustained flight in the air, a propeller on the plane unit, and means for transmitting drive from the engine to said propeller including means making a detachable connection with the outwardly projecting drive shaft in the engine, manual control means on the auto unit adapted to be detachably connected with control means on the plane unit connected with its control surfaces, means for operating certain of said manual control means on the auto unit by said steering wheel when disconnected from its normal operating connections, a foot operable rudder control for operating the other of said manual control means on the auto unit, couplings for detachably connecting said control means on the auto and plane units, correlated couplings for detachably connecting the plane unit with the auto unit and disposed in juxtaposition with the last named couplings, and a single means joining inner engaged couplings on the two units whereby the units are connected and their control means simultaneously interconnected.

3. A combination land and air vehicle of the character described comprising an auto unit having driving and steering ground-engaging wheels and an engine for transmitting drive to the driving wheels, said engine having a drive extension adapted for driving the propeller of the plane unit, a self-supporting portable plane unit adapted to be detachably secured to the auto unit to form an autoplane, said plane unit comprising a transverse main wing, a tail group supported in rearwardly spaced relation from the wing, the wing and tail group including movable control surfaces, an upright middle fin also carried on said wing, a propeller mounted on the upper end thereof and a ground-engaging wheel carried on the lower end thereof, wheel supports depending from said wing in laterally and forwardly spaced relation to the middle fin carrying ground-engaging wheels on the lower ends thereof, the three ground-engaging wheels providing three-point support for the plane unit when detached from the auto unit, means for driving said propeller adapted to have detachable driving connection with the aforesaid drive extension of the engine on the auto unit, and manual control means on the auto unit detachably connected with control means on the plane unit connected with its control surfaces.

4. A combination land and air vehicle of the character described comprising an auto unit having driving and steering ground-engaging wheels and an engine for transmitting drive to the driving wheels, said engine having a drive extension adapted for driving the propeller of the plane unit, a self-supporting portable plane unit adapted to be detachably secured to the auto unit to form an autoplane, said plane unit comprising a transverse main wing, a tail group supported in rearwardly spaced relation from the wing, the wing and tail group including movable control surfaces, an upright middle fin also carried on said wing, a ground-engaging wheel carried on the lower end thereof, wheel supports depending from said wing in laterally and forwardly spaced relation to the middle fin carrying ground-engaging wheels on the lower ends thereof, said supports being retractible upwardly toward the wing, the three ground-engaging wheels providing three-point support for the plane unit when detached from the auto unit, a propeller on the plane unit, means for driving said propeller adapted to have detachable driving connection with the aforesaid drive extension of the engine on the auto unit, and manual control means on the auto unit detachably connected with control means on the plane unit connected with its control surfaces.

5. In a combination land and air vehicle of the character described, the combination of an auto unit comprising a body having a bifurcated rear end portion, an engine in said body for transmitting drive to drive wheels thereon, a plane unit comprising a body formed to provide a main supporting wing section and tail group with movable control surfaces, and a middle upright connector portion constructed to fit in the bifurcated rear end portion of the auto unit body, means for detachably connecting the bodies of the two units together when so assembled, a propeller on the plane unit having drive means therefor adapted to be detachably connected with the engine of the auto unit, and control means on the auto unit adapted to be detachably connected with control means on the plane unit for operating the movable control surfaces thereof.

6. In a combination land and air vehicle of the character described, the combination of an auto unit comprising a body having a bifurcated rear end portion and an engine in said body for transmitting drive to driving wheels thereon, a monoplane unit comprising a single main supporting wing and a tail group carried thereon in rearwardly spaced relation thereto, a middle rearwardly disposed downward projection on said wing adapted to enter the bifurcated rear end portion of the auto unit body, means extending between the auto unit body and said middle projection to detachably connect the parts together, two other downward projections on the wing in forwardly and laterally spaced relation with respect to the middle projection arranged to engage the opposite sides of the auto unit body, means extending between the auto unit body and said last-named projections for detachably securing the parts together, a propeller on the monoplane unit, means for detachably transmitting drive from the auto unit engine to said propeller, and retractible members extending downwardly from the wing of the monoplane unit on opposite sides of the middle thereof to provide with the aforesaid middle projection three-point support for the monoplane unit when detached from the auto unit.

7. In a combination land and air vehicle of the character described, an auto unit body having ground-engaging wheels for driving and steering the same and an engine in said body for transmitting drive to the driving wheels, a windshield on said body projecting upwardly in front of a driver compartment therein, and a monoplane unit comprising a main supporting wing having the middle front portion thereof cut away to register with the back of the driver compartment when the wing is superposed on the auto unit body, means for detachably securing said wing to the body, enclosure means for the top of the driver compartment carried on and projecting forwardly from the wing at the cut-away portion and adapted to register with the edge of the windshield on the auto unit body to form therewith a complete enclosure for the driver compartment, a propeller carried on the monoplane unit, and means for detachably transmitting drive to said propeller from the auto unit engine.

8. A combination land and air vehicle of the character described comprising an elongated auto body supported on a front steering wheel and rear driving wheels, said body constructed to provide a driver compartment between the front and rear wheels, a rearward engine compartment, and a bifurcated rear end portion, an engine in the engine compartment having detachable driving connection with the rear wheels, and having a rearwardly projecting drive shaft extending into the bifurcated rear end portion of the body, a plane unit comprising a wing portion and a tail portion interconnected, the wing portion constructed to straddle the auto unit body over the engine compartment and having a rearward and downward extension at the middle thereof fitting in the bifurcated rear end portion of said body, a propeller on the wing portion, and drive means therefor extending through the middle extension of the wing portion and including a part arranged to make a sliding detachable driving connection with the aforesaid rearwardly projecting drive shaft, and means for detachably securing the wing portion of the plane unit to the auto unit body.

9. A land and air vehicle as set forth in claim 8, including a windshield on the auto unit body extending over the front portion of the driver compartment, and top enclosure means for the driver compartment carried on the front of the wing portion of the plane unit and arranged to come into abutment with the edge portion of the windshield and form therewith a complete enclosure for the driver compartment.

10. In a combination land and air vehicle, a body providing a driver compartment therein and having ground-engaging wheels for driving and steering, an airplane wing section and tail section for supporting the body in flight, the wing section comprising ailerons and the tail section comprising a rudder and elevators, a propeller, drive means for the propeller and driving wheels, a manually operable steering wheel having a land travel and an air travel position, means for locking said manually operable steering wheel in land travel position, a device operatively connected with the aforesaid ground-engaging steering wheel, means providing a detachable operating connection between said device and said manually operable steering wheel in its land travel position, other devices operatively connected with the ailerons and rudder, means providing a detachable operating connection between the aileron operating device and said manually operable steering wheel in its air travel position, whereby said ailerons are operable by rotary motion of the wheel, means for operating the elevators by axial motion of said manually operable steering wheel in air travel position, foot operated rudder controls interconnected with the aforesaid rudder device and the rudder for operating the latter, and means for detachably connecting the steering device with the rudder device when the manually operable steering wheel is in air travel position.

11. In a combination land and air vehicle of the character described, the combination of an auto unit, manually operable control means thereon for the operation of ailerons, elevators and rudder, other controls thereon for land travel operation of the auto unit, a plane unit comprising wing and tail sections with ailerons on the wing section and elevators and rudder on the tail section, control means on the plane unit operatively connected with the ailerons, elevators and rudder, interlocking devices on the two units including unit couplings for detachably securing the same together, the devices on the auto unit including control couplers to which one end of the aileron, rudder, and elevator controls are extended, the devices on the plane unit including companion control couplers to which the companion ends of the aileron, elevator, and rudder controls are extended, and a single means co-operating jointly with the unit couplings and control couplers whereby said controls are detachably interconnected in the detachable connection of said interlocking devices.

12. A combination land and air vehicle control mechanism comprising a steering wheel, a control shaft secured thereto for rotary and endwise movement with the rotary and axial movement of the wheel, means for locking the wheel against axial movement in land travel position, a steering drum having cables wound thereon adapted to be connected with a ground-engaging steering wheel to steer the same, means providing a detachable driving connection between the control shaft and said drum while the steering wheel is locked in land travel position, a rudder control drum having cables wound thereon and adapted to be connected with an airplane rudder to operate the same, means for detachably connecting said drums to turn together when the shaft is disconnected from the steering drum and the steering wheel is in air travel position, means operable by endwise movement of the shaft adapted to operate airplane elevators, said means permitting free rotation of the shaft with respect thereto, a third drum having cables wound thereon and adapted to be connected with airplane ailerons to operate the latter upon rotation of the drum, and means for detachably connecting said drum with said shaft so as to turn with the shaft when the steering wheel is in air travel position but permit free rotation of the shaft with respect to said drum when the steering wheel is locked in land travel position.

13. In a combination vehicle of the class described, including two separable units with related control means on both units adapted to be detachably connected so as to permit separation of the units, mating interconnecting parts on the two units for detachably connecting the same, a pin movable through registering holes in the interfitted parts to fasten the same together, the two mating parts carrying two other mating parts arranged to interfit when the first-mentioned parts are interfitted, and having registering holes adapted to receive the locking pin to interconnect said parts when the first-mentioned parts are interconnected by said pin, the last-named mating parts being connected respectively to the control means on the two separable units, whereby said control means are detachably connected automatically in the detachable connection of said units.

14. In a combination vehicle of the class described, including two separable units with related control means on both units adapted to be detachably connected so as to permit separation of the units, mating interconnecting parts on the two units for detachably connecting the same, a pin movable through registering holes in the interfitted parts to fasten the same together, the two mating parts carrying two other mating cross-head parts having registering holes intermediate the ends thereof adapted to receive the locking pin to interconnect said parts when the first-mentioned parts are interconnected by said pin, and means connecting one end of each of said cross-head parts to the control means on the associated unit, whereby to transmit movement from one control means to the other when the units are interconnected, but permit disconnection of said units without disturbing the control means.

15. An autoplane comprising, in combination, an auto unit having ground-engaging wheels for driving and steering and an engine for transmitting drive to the driving wheels, a plane unit having means for detachably securing the same to the auto unit, a propeller on the plane unit, means for detachably transmitting drive from the first engine to said propeller when the units are secured together, an auxiliary engine on the plane unit, and a second propeller arranged to be driven thereby and disposed in close concentric relation with the first propeller whereby the auxiliary engine is adapted to be started by its propeller by the slip-stream reaction thereon of the first propeller.

16. A land and air vehicle of the character described comprising a body having a pair of laterally spaced drive wheels intermediate the ends thereof, a single front steering wheel on the longitudinal center-line of the body and a single normally elevated rear wheel on the longitudinal center-line of the body, the front wheel being spring cushioned and the rear wheel being retractible, an engine in the body substantially directly over the drive wheels, a wing section and tail section for supporting the body in flight, the wing section disposed substantially directly over the drive wheels and engine, a pusher type propeller on the rear of the wing section, and means for transmitting drive selectively to the propeller and drive wheels or to the propeller alone.

17. In a combination land and air vehicle of the character described, an auto unit, supporting surfaces therefor to sustain the same in flight, the auto unit comprising a body having a narrow front portion and a wider rear portion with steering means on the front portion and a pair of laterally spaced drive wheels in the rear portion, an engine in the rear portion for transmitting drive to the drive wheels, outwardly projecting fenders on the rear portion extending over said drive wheels, and tiltable lights mounted in the forward portions of said fenders to direct light substantially horizontally forwardly through upper windows provided in the walls of said fenders or project light downwardly and forwardly through lower windows provided therefor in the walls of said fenders.

18. In a combination land and air vehicle of the character described, the combination of an auto unit comprising a body having a bifurcated rear end portion and an engine in said body for transmitting drive to driving wheels thereon, a monoplane unit comprising a single main supporting wing and a tail group carried thereon in rearwardly spaced relation thereto, a middle rearwardly disposed downward projection on said wing adapted to enter the bifurcated rear end portion of the auto unit body, means extending between the auto unit body and said middle projection to detachably connect the parts together, two other downward projections on the wing in forwardly and laterally spaced relation with respect to the middle projection arranged to engage the opposite sides of the auto unit body, means extending between the auto unit body and said last-named projections for detachably securing the parts together, a propeller on the monoplane unit, and means for detachably transmitting drive from the auto unit engine to said propeller.

19. In a combination land and air vehicle of the character described, the combination of an auto unit, manually operable control means thereon for the operation of ailerons, elevators and rudder, other controls thereon for land travel operation of the auto unit, a plane unit comprising wing and tail sections with ailerons on the wing section and elevators and rudder on the tail section, control means on the plane unit operatively connected with the ailerons, elevators and rudder, interfitting fastening portions on the two units for detachably connecting the same, locking pins entered through registering holes provided in said portions, and interfitting control members on the two units also interconnected by the same pins entering registering holes provided in the related control members, the control members on the plane unit being operatively connected to the ailerons, elevators and rudder, and the control members on the auto unit being adapted to be manually operable from the auto unit.

20. In a combination land and air vehicle of the character described, the combination of an auto unit, manually operable control means thereon for the operation of ailerons, elevators and rudder, other controls thereon for land travel operation of the auto unit, a plane unit comprising wing and tail sections with ailerons on the wing section and elevators and rudder on the tail section, control means on the plane unit operatively connected with the ailerons, elevators and rudder, interfitting fastening portions on the two units for detachably connecting the same, locking pins entered through registering holes provided in said portions, and interfitting control members on the two units also interconnected by the same pins entering registering holes provided in the related control members, the control members on the plane unit being operatively connected to the ailerons, elevators and rudder, auto steering means on the auto unit normally operating a steering wheel thereon, means for detachably connecting some of the control members on the auto unit with said auto steering means for operation thereby of the ailerons and elevators, and a rudder control means on the auto unit operatively connected with the remaining control member on the auto unit for operation of the rudder on the plane unit.

21. In a combination land and air vehicle of the character described, the combination of an auto unit, manually operable control means thereon for the operation of ailerons, elevators and rudder, other controls thereon for land travel operation of the auto unit, a plane unit comprising wing and tail sections with ailerons on the wing section and elevators and rudder on the tail section, control means on the plane unit operatively connected with the ailerons, elevators and rudder, interfitting fastening portions on the two units for detachably connecting the same, locking pins entered through registering holes provided in said portions, and interfitting control members on the two units also interconnected by the same pins entering registering holes provided in the related control members, the control members on the plane unit being operatively connected to the ailerons, elevators and rudder, auto steering means on the auto unit normally operating a steering wheel thereon, means for detachably connecting some of the control members on the auto unit with said auto steering means for operation thereby of the ailerons and elevators, means for detachably connecting the steering wheel with the rudder control member on the auto unit when the auto steering means is connected with the aileron and elevator control members, and a rudder control means on the auto unit operatively connected with the rudder control member to operate the rudder on the plane unit and the steering wheel on the auto unit simultaneously.

22. A combination land and air vehicle of the character described comprising an auto unit having driving and steering ground-engaging wheels and an engine for transmitting drive to the driving wheels, said engine having a drive extension adapted for driving the propeller of the plane unit, a portable plane unit adapted to be detachably secured to the auto unit to form an autoplane, said plane unit comprising a transverse main wing, a tail group supported in rearwardly spaced relation from the wing, the wing and tail group including movable control surfaces, an upright middle fin also carried on said wing, a propeller mounted on the upper end thereof, means for driving said propeller adapted to have detachable driving connection with the aforesaid drive extension of the engine on the auto unit, and manual control means on the auto unit detachably connected with control means on the plane unit connected with its control surfaces.

23. A combination land and air vehicle of the character described comprising an auto unit having driving and steering ground-engaging wheels and an engine for transmitting drive to the driving wheels, said engine having a drive extension adapted for driving the propeller of the plane unit, a portable plane unit adapted to be detachably secured to the auto unit to form an autoplane, said plane unit comprising a transverse main wing, a tail group supported in rearwardly spaced relation from the wing, the wing and tail group including movable control surfaces, a propeller, and means for driving said propeller adapted to have detachable driving connection with the aforesaid drive extension of the engine on the auto unit, the control surfaces including a rudder, and manual control means on the auto unit adapted to be detachably connected with control means on the plane unit for movement of its control surfaces, said manual control means including a steering wheel normally operatively connected with the ground engaging steering wheel of the auto unit but arranged to be disconnected therefrom and to be connected to the control means on the plane unit for operation of its control surfaces with the exception of the rudder, and said manual control means further including a foot rudder control for operating the rudder and arranged to be connected with the ground engaging steering wheel.

24. In a combination land and air vehicle of the character described, the combination of an auto unit comprising a body having a bifurcated rear end portion and an engine in said body for transmitting drive to driving wheels thereon, a plane unit comprising a main supporting wing and a tail group carried thereon in rearwardly spaced relation thereto, a middle rearwardly disposed downward projection on said wing adapted to enter the bifurcated rear end portion of the auto unit body, means extending between the auto unit body and said middle projection to detachably connect the parts together, a propeller on the plane unit, means for detachably transmitting drive from the auto unit engine to said propeller, and retractible members extending downwardly from the wing of the plane unit on opposite sides of the middle thereof to provide with the aforesaid middle projection three-point support for the plane unit when detached from the auto unit.

25. In a combination land and air vehicle of the character described, the combination of an auto unit comprising a body having a bifurcated rear end portion and an engine in said body for transmitting drive to driving wheels thereon, a plane unit comprising a main supporting wing and a tail group carried thereon in rearwardly spaced relation thereto, a middle rearwardly disposed downward projection on said wing adapted to enter the bifurcated rear end portion of the auto unit body, means extending between the auto unit body and said middle projection to detachably connect the parts together, two other downward projections on the wing in forwardly and laterally spaced relation with respect to the middle projection arranged to engage the opposite sides of the auto unit body, means extending between the auto unit body and said last-named projections for detachably securing the parts together, a propeller on the plane unit, and means for detachably transmitting drive from the auto unit engine to said propeller.

26. In a combination land and air vehicle of the character described, an auto unit body having ground-engaging wheels for driving and steering the same and an engine in said body for transmitting drive to the driving wheels, a windshield on said body projecting upwardly in front of a driver compartment therein, said engine having a rearwardly projecting drive extension, and a plane unit adapted to be coupled to the auto unit from the rear thereof, said plane unit comprising a main supporting wing having the middle front portion thereof cut away to register with the back of the driver compartment when the wing is mounted on the auto unit body, means for detachably securing said wing to said body upon forward movement of the wing relative to the body, enclosure means for the top of the driver compartment carried on and projecting forwardly from the wing at the cut-away portion and adapted to register with the edge of the windshield on the auto unit body to form therewith a complete enclosure for the driver compartment, a propeller on the plane unit, and means for detachably connecting said propeller with the rearwardly projecting drive extension of the engine upon forward movement of the plane unit relative to the auto unit body.

27. A combination vehicle as set forth in claim 26, wherein the rear portion of the auto unit body is bifurcated and the plane unit has a key projection arranged to enter said bifurcated portion, the vehicle including means for connecting said interfitted portions of said units together.

28. A combination vehicle as set forth in claim 26, including laterally spaced key projections on the plane unit arranged to engage in recesses provided therefor in the auto unit body on opposite sides of the driver compartment, and means for detachably connecting said interfitting portions of said units together.

29. A combination vehicle as set forth in claim 8, including manually operable control means on the auto unit and control means operable thereby on the plane unit having connections with the movable control surfaces of said plane unit, the control means on the auto unit and control means on the plane unit being so arranged as to be detachably interconnected by the means for detachably securing the wing portion of the plane unit to the auto unit body.

30. In a combination land and air vehicle, an auto unit having ground engaging driving and steering wheels and an engine for driving said driving wheels, a detachable plane unit comprising wing and tail sections having ailerons, rudders and elevators, and a propeller for said plane unit, a manually operable steering wheel in the auto unit having a land travel and an air travel position, means for locking said wheel in land travel position, a device operatively connected with the aforesaid ground engaging steering wheel, means providing a detachable operating connection between said device and said manually operable steering wheel in its land travel position, other devices in the auto unit for operating the ailerons and rudder, means providing a detachable operating connection between the aileron operating device and the manually operable steering wheel in its air travel position so that said ailerons are operable by rotary motion of the wheel, means in the auto unit for operating the elevators by axial motion of said manually operable steering wheel in air travel position, foot operated rudder controls in the auto unit for operating the rudder device, means for detachably connecting the steering device with the rudder device when the manually operable steering wheel is in air travel position, means for detachably connecting the propeller with the engine, and correlated means for simultaneously detachably connecting the plane unit with the auto unit and connecting the ailerons and rudder with the aforesaid operating devices in the auto unit and connecting the elevators with the aforesaid operating means in the auto unit.

31. A combination land and air vehicle control mechanism comprising a steering wheel, a control shaft secured thereto for rotary and endwise movement with the rotary and axial movement of the wheel, means for locking the wheel against axial movement in land travel position, a steering drum having cables wound thereon adapted to be connected with a ground-engaging steering wheel to steer the same, means providing a detachable driving connection between the control shaft and said drum while the steering wheel is locked in land travel position, means operable by endwise movement of the shaft adapted to operate airplane elevators, said means permitting free rotation of the shaft with respect thereto, a drum having cables wound thereon and adapted to be connected with airplane ailerons to operate the latter upon rotation of the drum, and means for detachably connecting said drum with said shaft so as to turn with the shaft when the steering wheel is in air travel position but permit free rotation of the shaft with respect to said drum when the steering wheel is locked in land travel position.

32. A combination land and air vehicle control mechanism comprising a steering wheel, a control shaft secured thereto for rotary and endwise movement with the rotary and axial movement of the wheel, means for locking the wheel against axial movement in land travel position, means operable by endwise movement of the shaft adapted to operate airplane elevators, said means permitting free rotation of the shaft with respect thereto, a drum having cables wound thereon and adapted to be connected with airplane ailerons to operate the latter upon rotation of the drum, and means for detachably connecting said drum with said shaft so as to turn with the shaft when the steering wheel is in air travel position but permit free rotation of the shaft with respect to said drum when the steering wheel is locked in land travel position, said steering wheel being arranged to operate ground-engaging steering means when locked in land travel position.

33. In a combination land and air vehicle of the class described, comprising separable auto and plane units, the auto unit having an engine thereon for driving the same and the plane unit having a propeller thereon, means for detachably connecting the propeller with the engine when the units are connected, said units having related control means adapted to be detachably connected so as to permit separation of the units, mating interconnecting parts on the two units for detachably connecting the same, a pin movable through registering holes in the interfitted parts to fasten the same together, the two mating parts carrying two other mating parts arranged to interfit when the first-mentioned parts are interfitted, and having registering holes adapted to receive the locking pin to interconnect said parts when the first-mentioned parts are interconnected by said pin, the last-named mating parts being connected respectively to the control means on the two separable units, whereby said control means are detachably connected automatically in the detachable connection of said units, and switch means in the electrical ignition circuit for said engine operable to closed circuit position by the aforesaid locking pin.

34. A combination land and air vehicle comprising an auto unit having driving and steering ground-engaging wheels and an engine for transmitting drive to the driving wheels, wing and tail sections carried on the auto unit for sustaining the same in flight, a propeller operatively associated with said wing and tail sections, means for detachably connecting said propeller with the first-mentioned engine, an auxiliary engine, and a second propeller arranged to be driven thereby and disposed in close concentric relation with the first propeller, whereby the auxiliary engine is adapted to be started by its propeller by the slip-stream reaction thereon of the first propeller.

35. A land and air vehicle of the character described comprising a body having a pair of laterally spaced drive wheels intermediate the ends thereof, front steering means on the body and a single normally elevated rear wheel on the longitudinal center-line of the body, the front steering means being spring cushioned and the rear wheel being retractible, an engine in the body substantially directly over the drive wheels, a wing section and tail section for supporting the body in flight, the wing section disposed substantially directly over the drive wheels and engine, a propeller operatively associated with the wing section, and means for transmitting drive selectively to the propeller and drive wheels or to the propeller alone.

36. A land and air vehicle comprising a body having a narrow front portion and a wider rear portion, a pair of laterally spaced drive wheels on the wider rear portion, steering means on the narrow front portion, an engine in the body substantially directly over the drive wheels, a wing section and tail section for supporting the body in flight, the wing section being disposed substantially directly over the drive wheels and engine, a propeller operatively associated with the wing section, means for transmitting drive selectively to the propeller and drive wheels or to the propeller alone, outwardly projecting fenders on the rear portion of the body extending over the drive wheels, and tiltable lights in the forward portions of said fenders for directing light forwardly through upper openings provided in said fenders or directing light downwardly and forwardly through lower openings provided in said fenders.

JOHN A. JOHNSON.